3,639,322
METHOD OF TREATING ASPHALTENES PRIOR
TO HIGH TEMPERATURE PROCESSING WITH
VARIOUS HIGH POLYMERS
Robert J. Bathgate, Media, Pa., and Jackson S. Boyer, Claymont, Del., assignors to Sun Oil Company, Philadelphia, Pa.
No Drawing. Filed June 13, 1968, Ser. No. 736,578
Int. Cl. C08f 45/52; C08g 51/52
U.S. Cl. 260—28.5 A                              5 Claims

ABSTRACT OF THE DISCLOSURE

A process for forming improved asphaltene-high molecular weight thermoplastic polymer products wherein the asphaltene prior to incorporation into the polymer is subjected to a heating treatment, and further the products formed by the improved process.

This invention relates to compositions of high molecular weight polymers and asphaltene, and more particularly to a new process for improving such compositions.

In recent years, asphaltenes have been found to be very useful as extenders or reinforcers in high polymer compositions. Unlike other well-known fillers for polymers, the asphaltene has been effective not only for decreasing the cost of the final product, but has in several instances improved the physical properties of the polymer. In a copending application, Ser. No. 727,349 filed May 7, 1968, it has been disclosed that when minor amounts of asphaltene are incorporated in a fiber grade nylon, a product having substantially improved physical properties is obtained. Also, in a recent thesis, "A Study of the Effect of Asphaltenes on the Mechanical Properties of Thermoplastics" by F. J. Doyle, Villanova University, June, 1966, it was determined that asphaltene had a varied effect on several polymers, but it did tend to upgrade the properties of polypropylene, nylon molding powder, and polycarbonates.

Asphaltenes are the high molecular weight disperse phase of asphalts. They are organic materials and are defined by their solubility characteristics in certain arbitrarily selected solvents. The asphaltenes are insoluble in low-boiling saturated hydrocarbons such as petroleum naphtha, pentane, and hexane but are soluble in carbon tetrachloride and carbon disulfide. These solubility characteristics are the basis of the separation of asphaltenes as a distinct phase. They are usually separated from the solvent in the form of a coarse brown-black powder having essentially no cohesiveness. The yield and properties of an asphaltene depend upon the asphalt source, the kind and amount of solvent used for separation, and the separation conditions. Asphaltenes have a high carbon-to-hydrogen atomic ratio and contain varying amounts of oxygen, sulfur, and nitrogen. A high carbon-to-hydrogen ratio indicates a strongly aromatic nature. For example, the value for saturated hydrocarbons is about 0.5; for benzene, about 1.0; and for naphthalene, about 1.25. The C:H ratio of asphaltenes derived from some typical sources is as follows:

| Origin: | C:H ratio of asphaltenes [1] |
|---|---|
| Residual bitumens | .85–.21 |
| Blown bitumens | .82–.88 |
| Highly cracked material | 1.25 |
| Trinidad asphalt | .79 |
| Gilsonite | .71 |

[1] Naphtha precipitation.

Asphaltenes are believed to have a molecular weight of from about 2,000 to about 10,000. The actual molecular configuration of asphaltenes is not known. Some observers suggest a configuration involving large fused rings, and others suggest smaller fused rings joined by and bearing aliphatic chains. (Pfeiffer: The Properties of Asphaltic Bitumen, Elsevier, 1950.)

In forming these new high polymer-asphaltene compositions, it is necessary to subject the composition to high processing temperatures in the order of 450° to 525° F. during extrusion. It has been found, however, that by processing at these high temperatures, the asphaltenes tend to emit a gaseous material which causes voids in the fabricated products. The voids created in the composition create poor surface characteristics of the final product, decrease the compatibility of the components, and decrease the melt viscosity of the composition. Although the voids are of limited significance when minor amounts of asphaltene are present, i.e., 1 to 10 wt. percent, these inconsistencies are significant when greater than 20% by weight asphaltene is present.

As a general operating procedure of the instant invention, asphaltene which is generally in granular form and which is to be incorporated into the high polymer is first heated for approximately ½ to 5 hours at 450° to 525° F. The asphaltene is then reground to a powder and extruded with the high polymer at concentrations of 1 to 50% by weight, and preferably 1 to 30% by weight. Various heating and extruding apparatus can be employed in the process to obtain the beneficial results.

The source of the asphaltenes is not critical. Any bitumen, asphalt, or crude residuum containing asphaltenes is suitable. The two principal sources are native asphalts and asphalts resulting from petroleum refining operations. Asphalt from petroleum refining operations like deasphalting of crude oils will usually require further solvent treatment to separate or further concentrate the asphaltenes. Air-blown and other chemically treated asphalts can be used. It is not necessary that the asphaltene concentration of the starting material be 100%. However, a concentration of at least 80 wt. percent asphaltenes in the asphaltene concentrate is required to obtain products with the desired properties. The preferred concentration of asphaltenes is 90 to 100% by weight. Solvents such as petroleum naphtha, pentane, hexane, cyclohexane, and diethylether can be used to concentrate the asphaltenes.

The softening point of the original asphaltene material can be from about 300° to 500° F., preferably 425° to 450° F., and it is 95 to 99% soluble in $CS_2$. These properties depend on the conditions of the method of concentration, e.g., solvent, severity, and number of stages. Preferably, the asphaltene contains less than 8% by weight sulfur.

Various high molecular weight thermoplastic polymers which are known to be compatible with asphaltenes are suitable for the instant process. Generally, any thermoplastic material having a molecular weight greater than 1500 will be operable. Such polymers include nylon molding powder, fiber grade nylon, polycarbonates, polypropylene, and polystyrenes. Particularly beneficial results are obtained when nylon, either as a molding powder grade or as a fiber grade, is employed. Nylon is generic term for any long chain, synthetic polymeric amide which has recurring amide groups as an integral part of the main polymer chain and which is capable of being formed into a filament in which the structural elements are oriented in the direction of the axis.

As a specific but nonlimiting example of the instant invention, an asphaltene was precipitated from a mixture of 75 wt. percent Lagomedio and 25 wt. percent Sweden residuum by hexane solubilization of the accompanying low molecular weight materials. The precipitated asphaltene fraction contained 10 wt. percent pentane solubles, had a softening point of 425° F. as determined with a Fisher Johns softening point apparatus, and a molecular weight of 3026 as determined by vapor phase osmometry.

The powdered asphaltene was placed in a tray and heated in an oven at 500° F. for approximately one hour. At the end of this period, the material was removed from the oven, cooled, weighed, and analyzed. The results are shown in Table I.

TABLE I.—EVALUATION OF HEAT TREATED ASPHALTENE

|  | Asphaltene (425° F. sp.) | Heat-treated asphaltene |
|---|---|---|
| Weight, grams | 100 | 98 |
| Elemental analysis (wt. percent): |  |  |
| Carbon | 79.80 | 79.24 |
| Hydrogen | 7.30 | 6.67 |
| Oxygen | 1.78 | 2.41 |
| Nitrogen | 1.42 | 1.08 |
| Sulfur | 4.42 | 4.34 |
| C:H mol. ratio | 0.91 | 0.99 |
| Pentane solubility (wt. percent) | 9.80 | 7.28 |

Following the heat treatment, the asphaltene was reground to a powder, dry blended, and extruded twice at 470° F. with a molding nylon powder at concentration of 25 and 50 wt. percent asphaltenes. The extruded filaments had very few voids in direct contrast with the untreated asphaltene blend that gave a soft, spongy extrudate; and the undesirable surface imperfections at these high concentrations of asphaltene were eliminated by use of the heat-treated materials. The nylon employed was Zytel 74, a nylon 6 trademark product of E. I. du Pont de Nemours and Company.

The extruded products were evaluated for their mechanical, thermal, and permanence properties; and the results along with comparative results for the nontreated asphaltene product and the pure nylon are shown in Table II.

As can be seen by the table, the yield strength of the heat-treated asphaltene blend at 25 wt. percent was similar to the pure nylon 6 and slightly superior to the 425° F. sp. asphaltene blend, while the elongation of the heat-treated blend was more than twice the value of the non-treated blend. The physical properties of the 50 wt. percent blends were similar. Higher melt viscosity of the blends, similar to the pure nylon 6, was obtained when the heat-treated asphaltenes were incorporated in the nylon at 25 and 50 wt. percent. In addition, the benzene extractability of the heat-treated blends was far superior to the non-treated blends. This test shows the compatibility of the components in the blend, and hence indicates the overall superiority of the heat-treated compounds.

While the particular methods and compositions as described herein are well adapted to meet the objects of the present invention, various modifications or changes may be resorted to without departing from the scope of the invention as defined in the claims.

We claim:

1. In the process of extruding a blend of a high molecular weight thermoplastic polymer selected from the group consisting of nylon, polycarbonates, polypropylene, and polystyrenes and an asphaltene of at least 80% by weight purity, the improvement whereby surface character of the extrudate is improved, which comprises the steps of heating the granular asphaltene to be incorporated at a temperature of about 450 to 525° F. for a time of about 0.5 to 5 hours, regrinding the heated asphaltene to a powder, blending it with the high molecular weight thermoplastic polymer in an amount of from about 1% to about 50% by weight of the blend, and extruding the blend at a temperature of about 450 to 525° F.

2. The process of claim 1 wherein the high molecular weight thermoplastic is nylon.

3. The process of claim 1 where the thermoplastic polymer is nylon and the asphaltene is present in an amount of 25% by weight of the blend.

4. The process of claim 1 where the thermoplastic polymer is nylon and the asphaltene is present in an amount of 50% by weight of the blend.

5. An improved extruded blended composition of nylon and from about 1% to about 50% by weight of the blend of asphaltene, said composition being made by the process of claim 1.

TABLE II

| Property | Zytel 74 | 25 wt. percent asphaltene; 75 wt. percent Zytel 74 | | 50 wt. percent asphaltene; 50 wt. percent Zytel 74 | |
|---|---|---|---|---|---|
|  |  | 25° F. sp. | Heat-treated asphaltene | 425° F. sp. | Heat-treated asphaltene |
| Yield strength, p.s.i. | 6,230 | 5,590 | 6,160 | 3,870 | 3,760 |
| Elongation at yield, percent | 33 | 4.1 | 8.6 | 1.8 | 1.6 |
| Tensile modulus, p.s.i. × $10^{-5}$ | 1.70 | 3.22 | 2.31 | 2.79 | 2.68 |
| Flexural modulus, p.s.i. × $10^{-5}$ | 1.22 | | 2.27 | | 2.64 |
| Heat deflection temperature, °F. (66 p.s.i. fiber stress) | 297 | | 316 | | |
| Melt viscosity at 453° F., poises × $10^{-3}$ | 8.20 | 4.05 | 7.15 | 2.24 | 7.26 |
| Water absorption, wt. percent: |  |  |  |  |  |
| 24 hours at 73° F | 3.30 | 1.91 | 2.15 | 1.14 | 1.36 |
| 2 hours in boiling H₂O | 5.90 | 3.22 | 3.51 | 2.26 | 2.67 |
| Benzene extractability, wt. percent | [1] 0.14 | 0.83 | 0.05 | 2.11 | 1.23 |

[1] Zytel 74 that was extruded one time.

References Cited

UNITED STATES PATENTS

| | | | |
|---|---|---|---|
| 3,036,900 | 5/1962 | Honeycutt | 260—28.5 AS |
| 3,317,447 | 5/1967 | Black | 260—28.5 AS |
| 3,329,636 | 7/1967 | Henschel | 260—28.5 AS |
| 3,336,252 | 8/1967 | Raichle | 260—28.5 AS |
| 3,257,336 | 6/1966 | Levy | 260—28.5 AS |
| 3,258,418 | 6/1966 | Pitchford | 208—44 |
| 3,278,472 | 10/1966 | Tamblyn | 260—28.5 AS |
| 3,440,073 | 4/1969 | Fowler | 208—22 |

MORRIS LIEBMAN, Primary Examiner

P. R. MICHL, Assistant Examiner

U.S. Cl. X.R.

260—28, 28.5 AS